(12) United States Patent
Kimura

(10) Patent No.: US 12,454,905 B2
(45) Date of Patent: Oct. 28, 2025

(54) RESERVE TANK AND COOLING SYSTEM INCLUDING THE SAME

(71) Applicant: TOYOTA JIDOSHA KABUSHIKI KAISHA, Toyota (JP)

(72) Inventor: Yuichiro Kimura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 18/507,427

(22) Filed: Nov. 13, 2023

(65) Prior Publication Data

US 2024/0263894 A1 Aug. 8, 2024

(30) Foreign Application Priority Data

Feb. 7, 2023 (JP) .................................. 2023-016746

(51) Int. Cl.
*F01P 11/02* (2006.01)
*B60K 11/02* (2006.01)

(52) U.S. Cl.
CPC ............. *F01P 11/029* (2013.01); *B60K 11/02* (2013.01)

(58) Field of Classification Search
CPC .. F01P 11/029; B01D 53/261; B01D 2257/80; F25B 43/006; B60K 11/02
See application file for complete search history.

(56) References Cited

U.S. PATENT DOCUMENTS 5,031,579 A * 7/1991 Evans .................... F01P 3/2207
                                                    123/41.74
2008/0005919 A1* 1/2008 Brown ...................... F17D 3/14
                                                          34/80

FOREIGN PATENT DOCUMENTS

JP     2005-259636 A       9/2005
JP     2008309434 A   *  12/2008

\* cited by examiner

*Primary Examiner* — Eric S Ruppert
(74) *Attorney, Agent, or Firm* — SoraIP, Inc.

(57) ABSTRACT

A reserve tank according to the present disclosure includes a tank body, a gas pipeline, and a hygroscopic material. The tank body has a storage portion for storing cooling liquid, and a communication portion provided above the storage portion so that the internal space and the external space of the storage portion can communicate with each other. The gas pipeline includes a first path extending downward from the communicating portion in the interior space of the accommodating portion, a folded path extending upward from the lower end of the first path and extending upward from the folded path, and a second path having an open end, through which gas can flow. The hygroscopic material is provided in the folded path.

9 Claims, 7 Drawing Sheets

RESERVE TANK AND COOLING SYSTEM INCLUDING THE SAME

CROSS-REFERENCE TO RELATED APPLICATION

This application claims priority to Japanese Patent Application No. 2023-016746 filed on Feb. 7, 2023, incorporated herein by reference in its entirety. BACKGROUND

1. Technical Field

The present disclosure relates to a reserve tank and a cooling system including the same.

2. Description of Related Art

Japanese Unexamined Patent Application Publication No. 2005-259636 (JP 2005-259636 A) describes a cooling device that cools a heat generating portion with a refrigerant. This cooling device includes a cooling circuit that supplies a refrigerant to a heat generating portion, and a reservoir tank that stores the refrigerant to replenish the cooling circuit. The reservoir tank is provided with limiting means that restrains the inflow of atmospheric air (oxygen component) while alleviating the difference between internal and external pressures that occurs when the internal pressure decreases as the refrigerant is replenished to the cooling circuit. The limiting means includes inert gas supply means that supplies an inert gas, and the inert gas is supplied from the inert gas supply means when the internal pressure of the reservoir tank is reduced.

SUMMARY

The reservoir tank disclosed in JP 2005-259636 A is supplied with the inert gas when the internal pressure of the tank is reduced. Here, depending on the device provided in the cooling circuit or the type of coolant (refrigerant), the reservoir tank can allow the inflow of gas other than the inert gas (for example, atmospheric air). However, in such a reservoir tank, the water vapor component in the inflow gas is cooled by the coolant in the tank, and condensation may occur inside the tank.

The present disclosure has been made in view of the above issue, and an object of the present disclosure is to provide a reserve tank that can suppress the occurrence of internal condensation, and a cooling system including the reserve tank.

A reserve tank according to the present disclosure includes a tank body, a gas pipeline, and a hygroscopic material. The tank body includes a storage portion that stores a coolant, and a communication portion that is provided above the storage portion such that an internal space and an external space of the storage portion are able to communicate with each other. The gas pipeline includes a first path extending downward from the communication portion in the internal space of the storage portion, a folded path extending upward from a lower end of the first path in a folded-back manner, and a second path extending upward from the folded path and including an open end. The gas pipeline is configured to allow gas to flow in the first path, the folded path, and the second path. The hygroscopic material is provided in the folded path.

According to the above configuration, gas in the external space flows into the internal space through the communication portion and the gas pipeline when the inside of the storage portion of the tank body is under a negative pressure. Here, when the gas in the external space contains water vapor, the gas is cooled by the coolant stored in the storage portion as the gas flows through the gas pipeline. Accordingly, condensation occurs in the gas pipeline. Liquid moisture generated in the gas pipeline flows downward into the folded path from each of the first path and the second path. In the folded path, this liquid moisture is absorbed by the hygroscopic material. Consequently, moisture in the gas flowing into the storage portion can be reduced, and the occurrence of condensation in the storage portion can be suppressed.

In the reserve tank according to one aspect of the present disclosure, the hygroscopic material may be composed of a material that changes color by absorbing moisture.

According to the above configuration, since the hygroscopic material is made of such a material, it is possible to easily determine when to replace the hygroscopic material in order to maintain the moisture absorption performance of the hygroscopic material.

In the reserve tank according to the aspect of the present disclosure, the hygroscopic material may be further provided in a part of the first path, or may not be provided in the first path.

According to the above configuration, the heat conductivity of the first path is improved in a portion where the hygroscopic material is not provided in the first path, so that the temperature of the inflow gas flowing through the first path is further lowered. Therefore, condensation is likely to occur in the gas pipeline. Thus, more moisture in the gas can be removed by the hygroscopic material.

In the reserve tank according to the aspect of the present disclosure, the hygroscopic material may be further provided in a part of the second path, or may not be provided in the second path.

According to the above configuration, the heat conductivity of the second path is improved in a portion where the hygroscopic material is not provided in the second path, so that the temperature of the inflow gas flowing through the second path is further lowered. Therefore, condensation is likely to occur in the gas pipeline. Thus, more moisture in the gas can be removed by the hygroscopic material.

A cooling system according to another aspect of the present disclosure includes any one of the reserve tanks described above, a coolant circuit, a pump, a heat-generating part, and a cooler. The coolant circuit is connected to the tank body of the reserve tank and constitutes a flow path for the coolant. The pump is provided in the coolant circuit and circulates the coolant in the coolant circuit. The heat-generating part is provided in the coolant circuit and cooled by the coolant. The cooler is provided in the coolant circuit and cools the coolant.

According to the above configuration, since the occurrence of condensation is suppressed in the storage portion of the reserve tank, it is possible to cool the heat-generating part while suppressing the mixing of moisture into the coolant in the coolant circuit.

According to the present disclosure, it is possible to suppress the occurrence of condensation inside the reserve tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
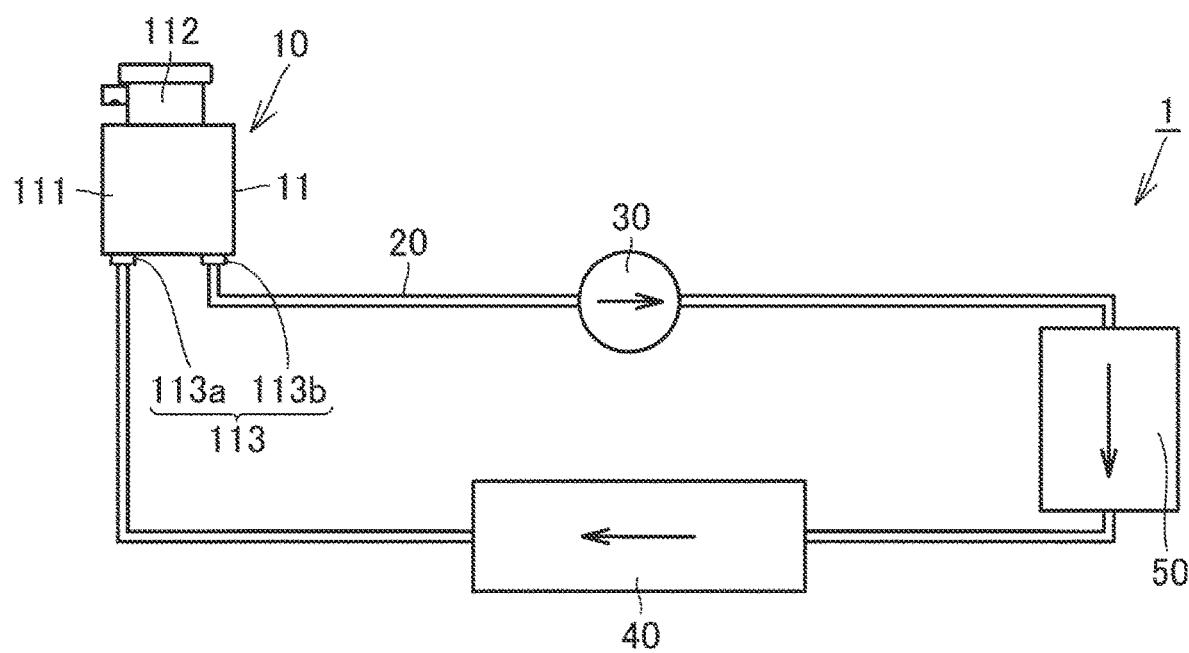
FIG. 1 is a schematic circuit diagram showing a cooling system according to Embodiment 1 of the present disclosure.

A reserve tank and a cooling system according to each embodiment will be described below with reference to the drawings. In the following description of the embodiments, the same or corresponding parts in the drawings are denoted by the same reference numerals, and the description thereof will not be repeated.

Embodiment 1

FIG. 1 is a schematic circuit diagram showing a cooling system according to Embodiment 1 of the present disclosure. As shown in FIG. 1, the cooling system 1 includes a reserve tank 10, a coolant circuit 20, a pump 30, heat-generating part 40 and a cooler 50.

A cooling system 1 according to an embodiment of the present disclosure may be mounted on a vehicle having a battery for running. The vehicle may be a plug-in hybrid electric vehicle or a hybrid electric vehicle, a battery electric vehicle or a fuel cell electric vehicle.

Figure 2:
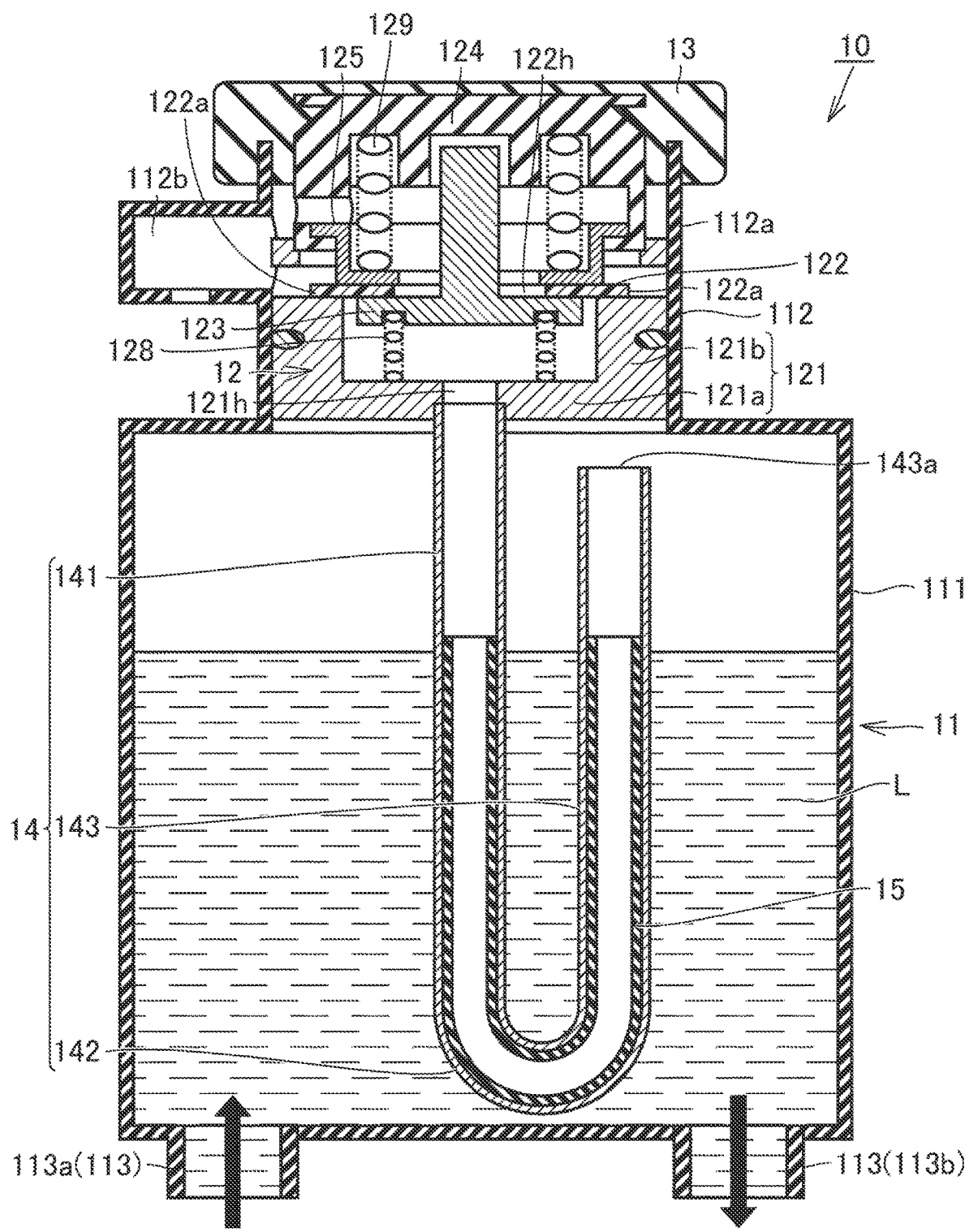
FIG. 2 is a cross-sectional view showing a reserve tank according to Embodiment 1 of the present disclosure.

FIG. 2 is a cross-sectional view showing a reserve tank according to Embodiment 1 of the present disclosure. As shown in FIG. 2, the reserve tank 10 is configured to be able to contain the coolant L.

As shown in FIG. 1, the coolant circuit 20 is connected to the reserve tank 10. The coolant circuit 20 constitutes a flow path for the coolant L. The coolant L circulating in the coolant circuit 20 is temporarily stored in the reserve tank 10. It is also possible to supply the coolant L into the coolant circuit 20 via the reserve tank 10.

Pump 30 is, for example, a water pump. A pump 30 is provided in the coolant circuit 20. When the pump 30 is driven, the pump 30 supplies the coolant L on the upstream side of the coolant circuit 20 as viewed from the pump 30 to the downstream side. Thus, the pump 30 circulates the coolant L within the coolant circuit 20.

The heat-generating part 40 is provided in the coolant circuit 20. The heat-generating part 40 is cooled by the coolant L. The type of heat-generating part 40 is not particularly limited, but it is typically a battery for running a vehicle.

A battery is an assembled battery that typically includes a plurality of cells. Therefore, when the heat-generating part 40 is a battery, the coolant L is preferably insulating oil from the viewpoint of ensuring insulation and cooling efficiency. When the coolant L is insulating oil, it is more important that the coolant L does not contain moisture from the viewpoint of suppressing deterioration of insulation. In addition, from the viewpoint of suppressing electrolysis of the mixed water in the battery, it is more important that the coolant L does not contain water.

Cooler 50 is provided in coolant circuit 20. The cooler 50 cools the coolant L. The cooler 50 is configured to cool the coolant L circulating in the coolant circuit 20. A specific configuration of the cooler 50 is not particularly limited. Cooler 50 is, for example, a radiator, and is configured such that air and coolant L can exchange heat with each other.

Next, a detailed configuration of the reserve tank 10 will be described. As shown in FIG. 2, the reserve tank 10 according to Embodiment 1 of the present disclosure includes a tank body 11, a pressure control valve 12, a lid portion 13, a gas pipeline 14, and a hygroscopic material 15.

The tank body 11 is configured to be connectable to the coolant circuit 20. In the cooling system 1 described above, the coolant circuit 20 is connected to the tank body 11 of the reserve tank 10 (see FIG. 1).

The tank body 11 has a storage portion 111 and a communication portion 112. The storage portion 111 is configured to be able to contain the coolant L. The communication portion 112 is provided above the storage portion 111 so that the inner space and the outer space of the storage portion 111 can communicate with each other. In this embodiment, the communication portion 112 is connected to the top surface of the storage portion 111.

The communication portion 112 has a cylindrical portion 112a extending upward from the storage portion 111 and a mouth portion 112b provided on the side of the cylindrical portion 112a. The coolant L can be supplied by an operator from above the storage portion 111 through the cylindrical portion 112a. The mouth portion 112b is configured to allow gas to flow between the inner space and the outer space of the storage portion 111 via the mouth portion 112b and the cylindrical portion 112a.

The tank body 11 further has one or more connection pipes 113 connected to the storage portion 111. The connection pipe 113 is connected to the coolant circuit 20. It is preferable that the connection pipe 113 is positioned as low as possible in the tank body 11. In this embodiment, the connection pipe 113 is provided on the bottom surface of the storage portion 111.

In this embodiment, the tank body 11 has a first connection pipe 113a and a second connection pipe 113b. The first connection pipe 113a is connected to the upstream side of the coolant circuit 20 when viewed from the tank body 11, and the second connection pipe 113b is connected to the downstream side of the coolant circuit 20 when viewed from the tank body 11 (see FIG. 1). That is, the coolant L flows into the storage portion 111 through the first connection pipe 113a, and the coolant L flows out of the storage portion 111 through the second connection pipe 113b.

The pressure control valve 12 is provided inside the communication portion 112. The pressure control valve 12 is fixedly connected to the lid portion 13. The pressure control valve 12 is removed from the communication portion 112 when the lid portion 13 is removed from the communication portion 112.

When the pressure in the inner space of the storage portion 111 is lower than the pressure in the outer space by a predetermined amount (hereinafter sometimes simply referred to as a "negative pressure state"), the pressure control valve 12 closes the outer space. Gas is configured to flow into the storage portion 111 via the communication portion 112. The negative pressure state of the storage portion 111 can occur, for example, when the temperature of the internal space of the storage portion 111 drops and the liquid level of the coolant L in the storage portion 111 drops.

Furthermore, in the present embodiment, the pressure control valve 12 is in a state where the pressure in the internal space of the storage portion 111 is higher than the pressure in the internal space by a predetermined amount (hereinafter, sometimes simply referred to as a "positive pressure state"). At least, the gas in the internal space of the storage portion 111 flows out of the storage portion 111 through the communication portion 112 when the storage portion 111 is closed.

The pressure control valve 12 has a base portion 121, a closing portion 122, a slide portion 123, an upper member 124 and a pressing member 125.

The base portion 121 is positioned at least below the mouth portion 112b within the cylindrical portion 112a. The base portion 121 has a bottom portion 121a having a through hole 121h, and a peripheral wall portion 121b extending upward from the bottom portion 121a and extending along the cylindrical portion 112a.

The closing portion 122 has a through hole 122h in the center. The closing portion 122 has a peripheral edge portion 122a that contacts the upper end of the peripheral wall portion 121b of the base portion 121. The closing portion 122 is pressed against the lower peripheral wall portion 121b.

The slide portion 123 is positioned inside the peripheral wall portion 121b. The slide portion 123 is separated from at least a portion of the peripheral wall portion 121b. The slide portion 123 is biased upward. Specifically, a biasing member 128 such as a spring is provided between the slide portion 123 and the bottom portion 121a. The slide portion 123 is in contact with the lower surface of the closing portion 122 and covers the through hole 122h from below. Therefore, the communication portion 112 is closed by the pressure control valve 12 when the pressure in the internal space of the tank body 11 is in a normal state (neither a negative pressure state nor a positive pressure state).

The upper member 124 is located above the closing portion 122 and is separated from the closing portion 122. The upper member 124 is connected to the base portion 121 so that its position relative to the base portion 121 is fixed.

The pressing member 125 is in contact with the upper surface of the closing portion 122 so as not to close the through hole 122h of the closing portion 122. The pressing member 125 is biased downward and presses the closing portion 122. As a result, the closing portion 122 is pressed against the peripheral wall portion 121b. Specifically, a biasing member 129 such as a spring is provided between the upper member 124 and the pressing member 125.

Figure 3:
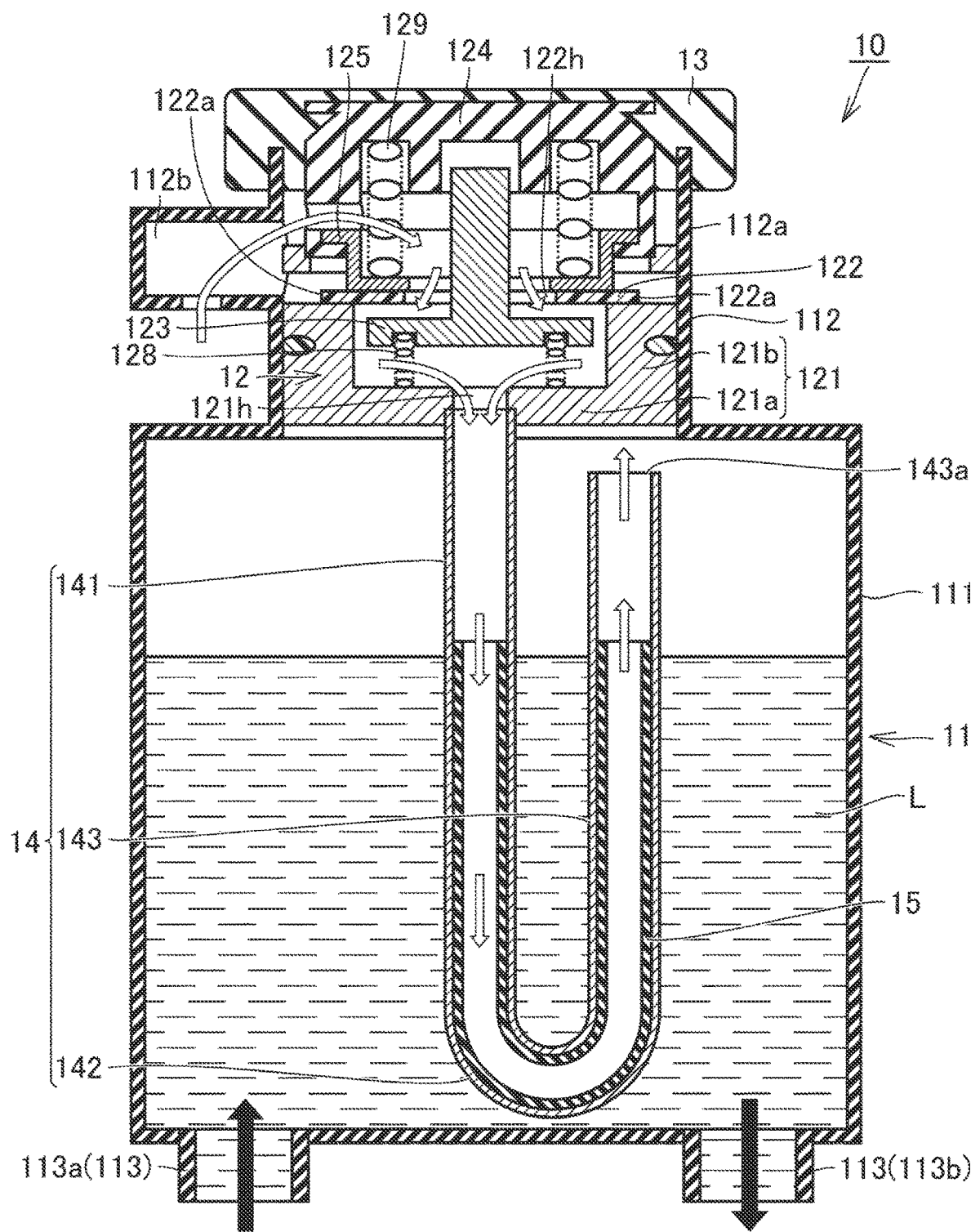
FIG. 3 is a cross-sectional view showing the reserve tank when the container is in a negative pressure state.

Next, operation of the pressure control valve 12 will be described. FIG. 3 is a cross-sectional view showing the reserve tank when the container is in a negative pressure state. As shown in FIG. 3, when the storage portion 111 is in a negative pressure state, the slide portion 123 is pushed down by the pressure from the external space. The slide portion 123 is separated from the closing portion 122. As a result, in the communication portion 112, through the through hole 122h of the closing portion 122, the gap between the closing portion 122 and the slide portion 123, the gap between the slide portion 123 and the peripheral wall portion 121b, and the through hole 121h of the bottom portion 121a, the gas (for example, atmospheric air) in the outer space flows into the inner space of the storage portion 111. In FIG. 3, the inflow path of the gas in the external space is indicated by white arrows.

Figure 4:
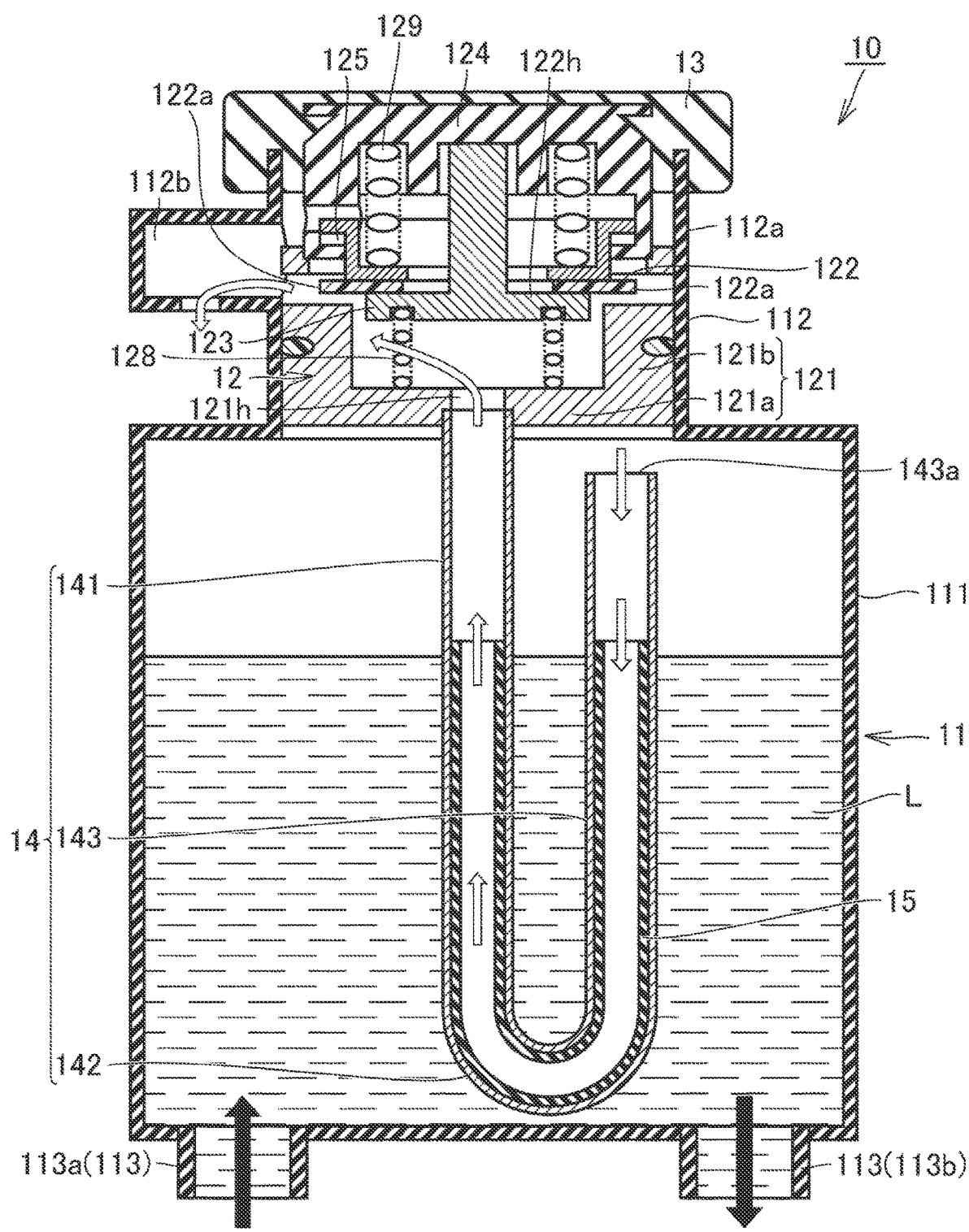
FIG. 4 is a cross-sectional view showing the reserve tank when the container is in a positive pressure state.

FIG. 4 is a cross-sectional view showing the reserve tank when the container is in a positive pressure state. As shown in FIG. 4, when the storage portion 111 is in a positive pressure state, the pressure in the internal space pushes up the slide portion 123. As the slide portion 123 is pushed up, the closing portion 122 is also pushed up, and the peripheral edge portion 122a of the closing portion 122 and the peripheral wall portion 121b of the base portion 121 are separated from each other. As a result, in the communication portion 112, the storage portion 111 is opened via the through hole 121h of the bottom portion 121a, the gap between the slide portion 123 and the peripheral wall portion 121b, and the gap between the peripheral edge portion 122a of the closing portion 122 and the base portion 121. Gases in the inner space (e.g., air and vapor of coolant L) flow out to the outer space. In FIG. 4, the outflow path of the gas in the internal space is indicated by white arrows.

As shown in FIG. 2, the lid portion 13 is provided at the upper open end of the cylindrical portion 112a of the communication portion 112. The lid portion 13 is configured to be detachable from the cylindrical portion 112a. The lid portion 13 is connected to the pressure control valve 12. As a result, when the lid portion 13 is removed, the pressure control valve 12 can also be removed, making it easy to replenish the tank body 11 with the cooling liquid. Specifically, the lid portion 13 is connected to the upper member 124.

The gas pipeline 14 is configured to allow gas to flow therethrough. In this embodiment, the gas pipeline 14 has a substantially U-shaped outer shape. Gas line 14 is connected to pressure control valve 12. Thereby, when the pressure control valve 12 is taken out to the outside, the gas pipeline 14 can also be taken out together. It is preferable that the gas pipeline 14 is positioned inside the cylindrical portion 112a when viewed from above so that the gas pipeline 14 can be easily taken out from the tank body 11.

The gas pipeline 14 has a first path 141, a folded path 142 and a second path 143.

The first path 141 extends downward from the communication portion 112 in the interior space of the storage portion 111. Specifically, the first path 141 extends downward from the pressure control valve 12 inside the communication portion 112. The first path 141 is connected to the bottom portion 121a of the base portion 121 of the pressure control valve 12. An upper opening end of the first path 141 is connected to the through hole 121h of the bottom portion 121a.

The folded path 142 extends upward from the lower end of the first path 141 so as to be folded back. The folded path 142 has a substantially semicircular outer shape.

The folded path 142 is positioned below the storage portion 111. The lower portion of the storage portion 111 is the lowest portion when the storage portion 111 is virtually divided into three in the vertical direction. The folded path 142 is positioned so as to be immersed in the coolant L contained in the storage portion 111.

The second path 143 extends upward from the folded path 142. The second path 143 has an open end 143a. The open end 143a is positioned above the storage portion 111. The upper portion of the storage portion 111 is the uppermost portion when the storage portion 111 is virtually divided into three in the vertical direction. The open end 143a faces upward.

When the storage portion 111 is in a negative pressure state, the gas in the external space flows into the first path 141 from the communication portion 112 via the pressure control valve 12. After that, the gas in the external space flows through the folded path 142 and the second path 143, and flows into the storage portion 111 from the open end 143a (see FIG. 3). When the storage portion 111 is in a positive pressure state, the gas in the internal space of the storage portion 111 flows into the second path 143 through the open end 143a. After that, the gas in the internal space flows through the folded path 142, the first path 141, and the communication portion 112, and flows out to the external space via the pressure control valve 12 (see FIG. 4).

The hygroscopic material 15 is provided in folded path 142. When the storage portion 111 is in a negative pressure state, as described above, the gas in the outer space flows into the inner space via the communication portion 112 and the gas pipeline 14 (see FIG. 3). Here, when the gas in the external space contains water vapor, the gas is cooled by the coolant L accommodated in the storage portion 111 when flowing through the gas pipeline 14. As a result, condensation occurs inside the gas pipeline 14. Liquid moisture generated in the gas pipeline 14 flows downward from the first path 141 and the second path 143 to the folded path 142. Liquid moisture is absorbed by the hygroscopic material 15 in the folded path 142. As a result, the water content of the gas flowing into the storage portion 111 can be reduced, and the occurrence of dew condensation in the storage portion 111 can be suppressed.

In addition, as described above, since the occurrence of condensation in the storage portion 111 of the reserve tank 10 is suppressed, in the cooling system 1, it is possible to suppress the mixing of water into the coolant L in the coolant circuit 20 and cool the heat-generating part 40.

In this embodiment, the hygroscopic material 15 is provided so as to cover the inner wall of the folded path 142. The hygroscopic material 15 is provided over the entire extending direction of the folded path 142.

In this embodiment, the hygroscopic material 15 is further provided in a part of the first path 141. As a result, liquid moisture condensed inside the first path 141 can be absorbed by the hygroscopic material 15 inside the first path 141. On the other hand, in a portion of the first path 141 where the hygroscopic material 15 is not provided, since the thermal conductivity of the first path 141 is improved, the temperature of the inflow gas flowing through the first path 141 is further lowered. Therefore, dew condensation is likely to occur inside the gas pipeline 14. As a result, more moisture in the gas can be removed by the hygroscopic material 15. In this embodiment, the hygroscopic material 15 in the first path 141 is provided so as to be connected to the hygroscopic material 15 in the folded path 142.

In this embodiment, the hygroscopic material 15 is further provided in a part of the second path 143. As a result, liquid moisture condensed within the second path 143 can be absorbed by the hygroscopic material 15 within the second path 143. On the other hand, in a portion of the second path 143 where the hygroscopic material 15 is not provided, the thermal conductivity of the second path 143 is improved, so that the temperature of the inflow gas flowing through the second path 143 is further lowered. Therefore, dew condensation is likely to occur inside the gas pipeline 14. As a result, more moisture in the gas can be removed by the hygroscopic material 15. In addition, in the present embodiment, the hygroscopic material 15 in the second path 143 is provided so as to be continuous with the hygroscopic material 15 in the folded path 142.

The hygroscopic material 15 is preferably made of a material that changes color by absorbing moisture. Since the hygroscopic material 15 is made of such a material, it is possible to easily determine when to replace the hygroscopic material 15 in order to maintain the moisture absorbing performance of the hygroscopic material 15. Materials that change color by absorbing moisture include, for example, silica gel.

Embodiment 2

Next, a reserve tank according to Embodiment 2 of the present disclosure will be described. The reserve tank according to the second embodiment of the present disclosure differs from the reserve tank according to the first embodiment of the present disclosure in the structure of the hygroscopic material. Therefore, description of the same configuration and effects as those of the reserve tank according to the first embodiment of the present disclosure will not be repeated.

Figure 5:
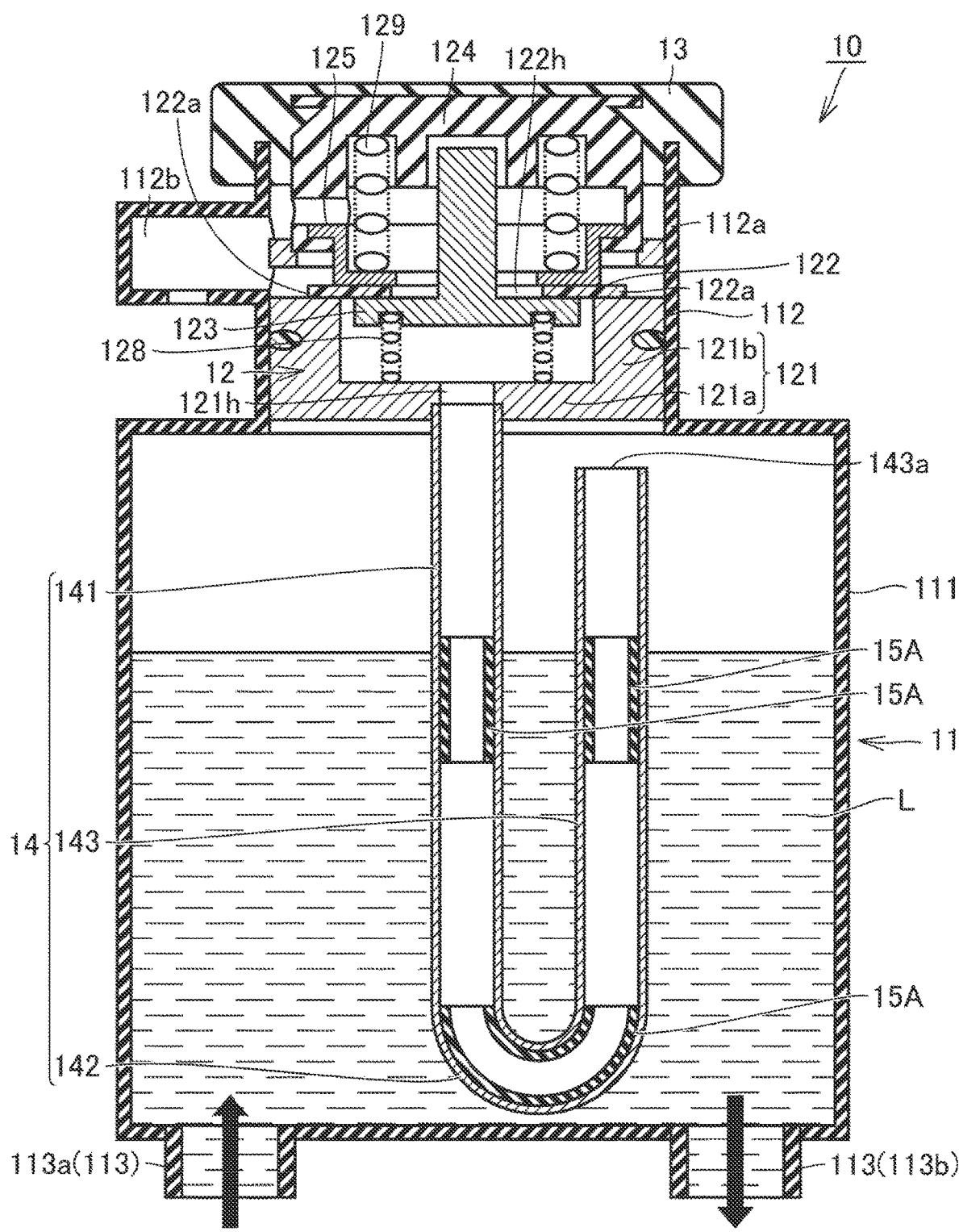
FIG. 5 is a cross-sectional view showing a reserve tank according to Embodiment 2 of the present disclosure.

FIG. 5 is a cross-sectional view showing a reserve tank according to Embodiment 2 of the present disclosure. As shown in FIG. 5, in this embodiment, the hygroscopic material 15A in the first path 141 is separated from the hygroscopic material 15A in the folded path 142. This improves the thermal conductivity of the first path 141 between the hygroscopic materials 15A that are separated from each other. As a result, the temperature of the inflow gas in the first path 141 is further lowered, dew condensation is more likely to occur in the first path 141, and more moisture in the gas can be removed by the hygroscopic material 15A.

Also, the hygroscopic material 15A in the second path 143 is separated from the hygroscopic material 15A in the folded path 142. This improves the thermal conductivity of the second path 143 between the hygroscopic materials 15A that are separated from each other. As a result, the temperature of the inflow gas in the second path 143 is further lowered, dew condensation is more likely to occur in the second path 143, and more moisture in the gas can be removed by the hygroscopic material 15A.

Embodiment 3

Next, a reserve tank according to Embodiment 3 of the present disclosure will be described. The reserve tank according to the third embodiment of the present disclosure differs from the reserve tank according to the first embodiment of the present disclosure in the structure of the hygroscopic material. Therefore, description of the same configuration and effects as those of the reserve tank according to the first embodiment of the present disclosure will not be repeated.

Figure 6:
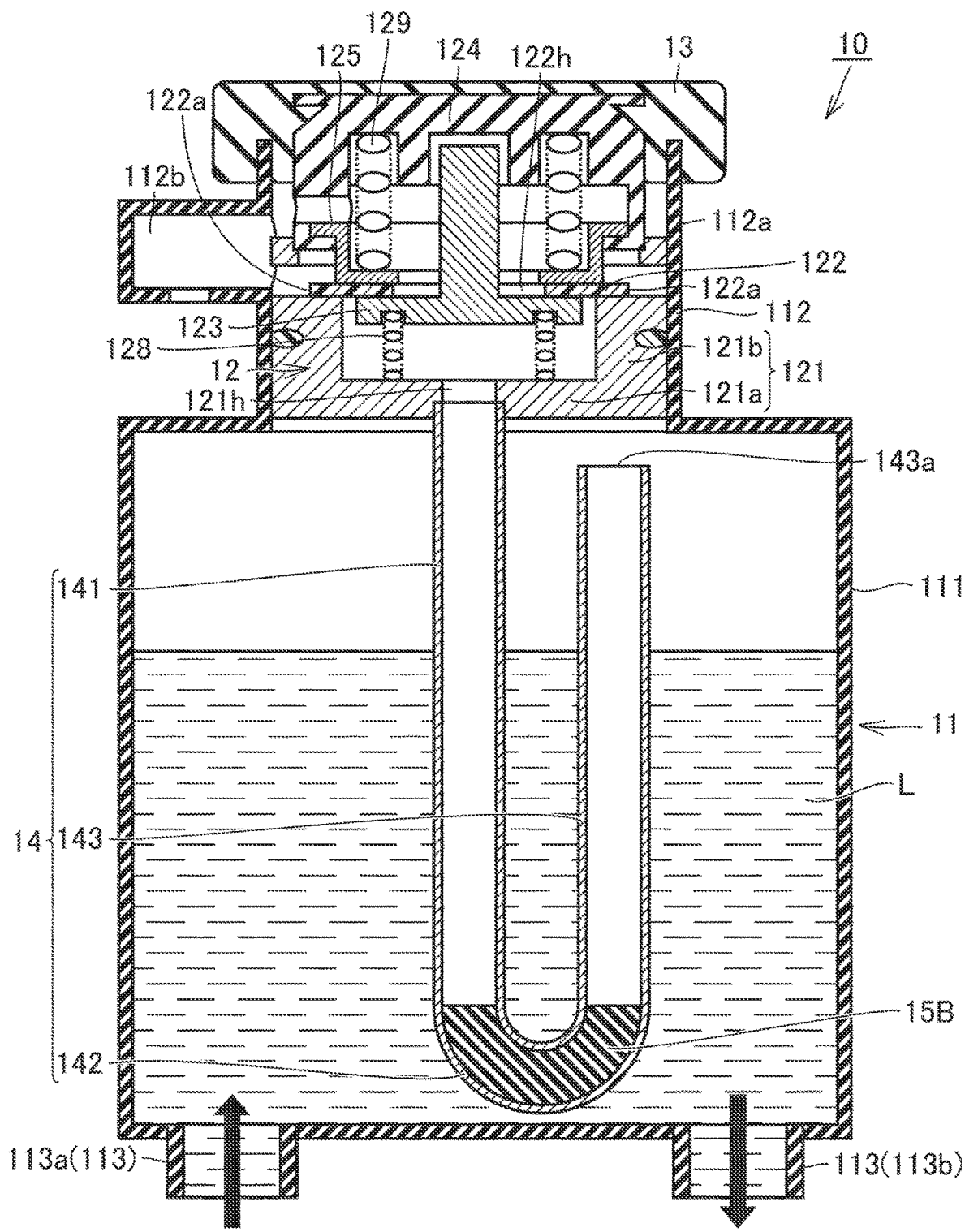
FIG. 6 is a cross-sectional view showing a reserve tank according to Embodiment 3 of the present disclosure.

FIG. 6 is a cross-sectional view showing a reserve tank according to Embodiment 3 of the present disclosure. As shown in FIG. 6, in this embodiment, the hygroscopic material 15B is not provided inside the first path 141. This further improves the thermal conductivity of the first path 141 and further reduces the temperature of the inflowing gas flowing through the first path 141. Therefore, dew condensation is more likely to occur inside the gas pipeline 14. As a result, more moisture in the gas can be removed by the hygroscopic material 15B.

The hygroscopic material 15B is not provided in second path 143. This further improves the thermal conductivity of the second path 143 and further reduces the temperature of the inflow gas flowing through the second path 143. Therefore, dew condensation is more likely to occur inside the gas pipeline 14. As a result, more moisture in the gas can be removed by the hygroscopic material 15B.

In addition, the hygroscopic material 15B is positioned over the entire cross section of the folded path 142 when viewed from the gas flow path direction (extending direction) of the folded path 142. This makes it easier for the hygroscopic material 15B to directly absorb the water vapor component contained in the inflow gas in the folded path 142. Incidentally, in the present embodiment, the hygroscopic material 15B is configured to allow gas to flow therethrough, and is composed of, for example, a porous material.

Embodiment 4

Next, a reserve tank according to Embodiment 4 of the present disclosure will be described. A reserve tank according to Embodiment 4 of the present disclosure differs from the reserve tank according to Embodiment 3 of the present disclosure in the configuration of the first path. Therefore, description of the same configuration and effects as those of the reserve tank according to the third embodiment of the present disclosure will not be repeated.

Figure 7:
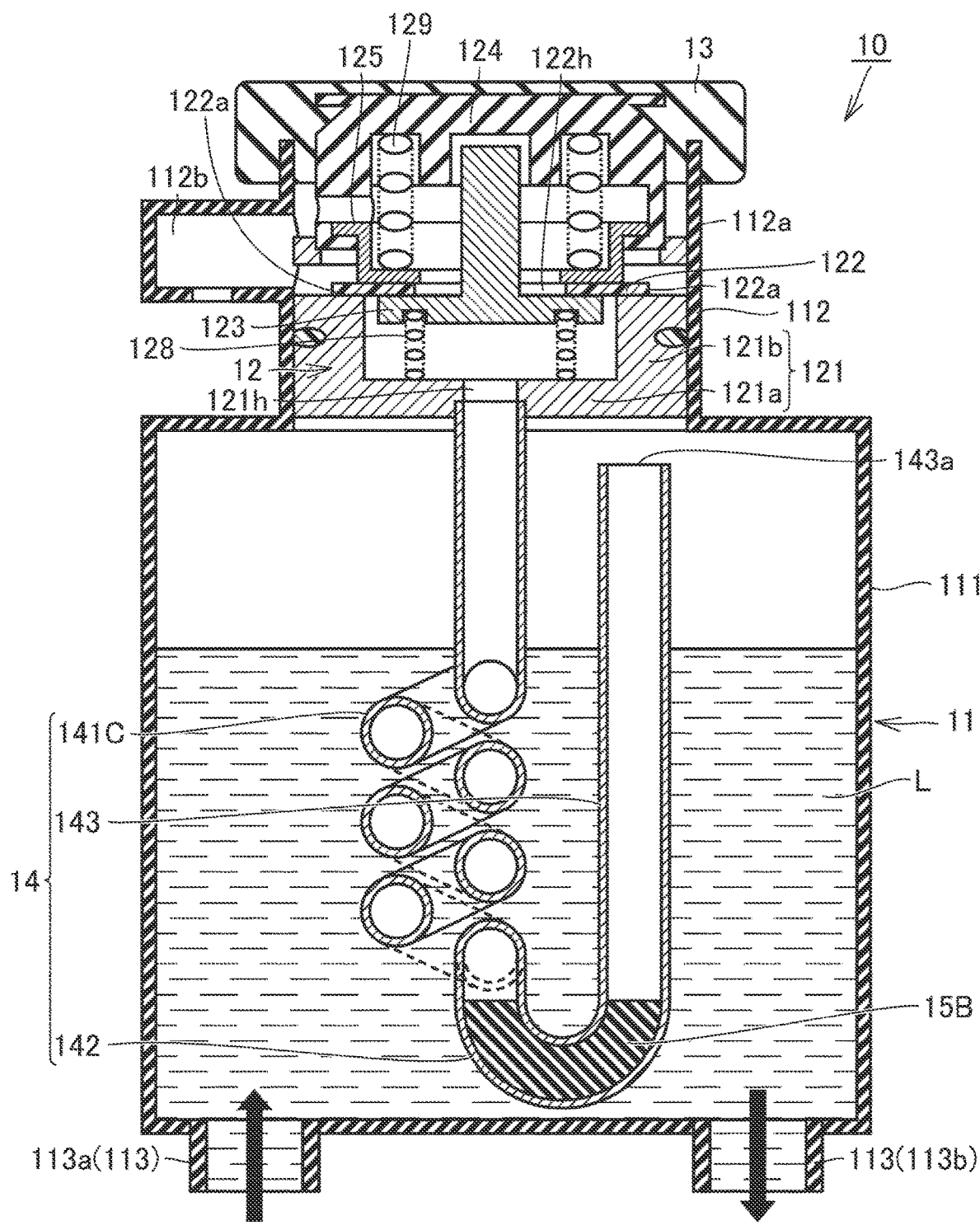
FIG. 7 is a cross-sectional view showing a reserve tank according to Embodiment 4 of the present disclosure.

FIG. 7 is a cross-sectional view showing a reserve tank according to Embodiment 4 of the present disclosure. As shown in FIG. 7, in this embodiment, the first path 141C has a helical outline. As a result, the surface area of the inner wall of the first path 141C can be increased and the length of the first path 141C can be increased, so that the temperature of the inflow gas can be further lowered in the first path 141C. Therefore, dew condensation is more likely to occur inside the gas pipeline 14. As a result, more moisture in the gas can be removed by the hygroscopic material 15B.

In the above description of the embodiments, combinable configurations may be combined with each other.

It should be considered that the embodiments disclosed this time are illustrative in all respects and not restrictive. The scope of the disclosure is represented by the appended claims, not by the above description, and includes all modifications within the meanings and scope equivalent to the claims.

What is claimed is:

1. A reserve tank comprising:
a tank body including a storage portion, a communication portion, a first connection pipe, and a second connection pipe,
the storage portion storing a liquid coolant,
the communication portion being provided above the storage portion and connecting an internal space and an external space of the storage portion, and
the liquid coolant flowing into the storage portion from a coolant circuit through the first connection pipe and flowing out of the storage portion to the coolant circuit through the second connection pipe;
a pressure control valve that is provided in the communication portion, the pressure control valve being configured to open to allow gas from the external space to flow into the internal space in a case where an internal pressure in the internal space is lower than an external pressure in the external space;
a gas pipeline that includes a first path extending downward from the communication portion in the internal space of the storage portion and being connected to the external space through the pressure control valve, a folded path extending upward from a lower end of the first path in a folded-back manner, and a second path extending upward from the folded path and including an open end, the gas pipeline being configured to allow gas to flow in the first path, the folded path, and the second path; and
a hygroscopic material provided in the folded path.

2. The reserve tank according to claim 1, wherein the hygroscopic material is composed of a material that changes color by absorbing moisture.

3. The reserve tank according to claim 1, wherein the hygroscopic material is further provided in a part of the first path, or is not provided in the first path.

4. The reserve tank according to claim 1, wherein the hygroscopic material is further provided in a part of the second path, or is not provided in the second path.

5. A cooling system comprising:
the reserve tank according to claim 1;
the coolant circuit that is connected to the tank body of the reserve tank and constitutes a flow path for the liquid coolant;
a pump that is provided in the coolant circuit and circulates the liquid coolant in the coolant circuit;
a heat-generating part provided in the coolant circuit and cooled by the liquid coolant; and
a cooler that is provided in the coolant circuit and cools the liquid coolant.

6. The reserve tank according to claim 1, wherein the pressure control valve includes a slide portion configured to move in response to a pressure difference between the internal space and the external space of the storage portion, and a biasing member configured to bias the slide portion.

7. The reserve tank according to claim 1, further comprising a lid portion that is detachable and configured to close the communication portion, wherein the pressure control valve is connected to the lid portion and is removable from the communication portion together with the lid portion.

8. The reserve tank according to claim 1, wherein
the hygroscopic material is further provided in a part of the first path and a part of the second path, and
the hygroscopic material in the first path and the hygroscopic material in the second path are spaced apart from the hygroscopic material provided in the folded path.

9. The reserve tank according to claim 1, wherein the first path of the gas pipeline is helical in shape.

\* \* \* \* \*